(12) United States Patent
Park et al.

(10) Patent No.: US 9,665,220 B2
(45) Date of Patent: May 30, 2017

(54) DISPLAY APPARATUS AND METHOD FOR DRIVING THE SAME WITH INCREASED TOUCH RECOGNITION

(71) Applicant: Samsung Display Co., Ltd., Yongin (KR)

(72) Inventors: Ji-Hong Park, Suwon-si (KR); Moon Shik Kang, Yongin-si (KR); Moon-Sung Choi, Incheon (KR); Sang-Min Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 10 days.

(21) Appl. No.: 14/451,790

(22) Filed: Aug. 5, 2014

(65) Prior Publication Data

US 2015/0220177 A1    Aug. 6, 2015

(30) Foreign Application Priority Data

Feb. 3, 2014    (KR) .......................... 10-2014-0012136

(51) Int. Cl.
*G06F 3/045* (2006.01)
*G06F 3/044* (2006.01)
*G06F 3/041* (2006.01)
*G02F 1/1333* (2006.01)
*G02F 1/1345* (2006.01)

(52) U.S. Cl.
CPC ............ *G06F 3/044* (2013.01); *G06F 3/0418* (2013.01); *G02F 1/13338* (2013.01); *G02F 1/13452* (2013.01)

(58) Field of Classification Search
CPC .... G06F 3/0412; G06F 3/044; G02F 1/13338; G02F 1/13452
USPC .................................................. 345/173, 174
See application file for complete search history.

(56) References Cited

U.S. PATENT DOCUMENTS

| 6,236,386 B1 * | 5/2001 | Watanabe ............. G06F 3/0412 345/100 |
| 6,677,925 B1 * | 1/2004 | Kawaguchi .......... G09G 3/3655 345/55 |
| 7,995,041 B2 | 8/2011 | Chang |

(Continued)

FOREIGN PATENT DOCUMENTS

| JP | 5296273 | 6/2013 |
| KR | 1020130039703 | 4/2013 |

(Continued)

*Primary Examiner* — Chanh Nguyen
*Assistant Examiner* — Yuzhen Shen
(74) *Attorney, Agent, or Firm* — H.C. Park & Associates, PLC

(57) ABSTRACT

A display apparatus including a display panel, a touch panel, a data driver, a common voltage noise predictor and a touch position detector. The display panel includes a plurality of data lines and a plurality of pixels. The pixels are electrically connected to the data lines, respectively. The touch panel is configured to output a first touch signal based on a touch event. The data driver is configured to output a data voltage to the data line based on a data signal. The common voltage noise predictor is configured to output a common voltage noise compensating signal based on the data signal. The touch position detector is configured to detect a touch position based on the common voltage noise compensating signal and the first touch signal.

14 Claims, 6 Drawing Sheets

(56) References Cited

U.S. PATENT DOCUMENTS

| | | | |
|---|---|---|---|
| 8,508,503 B2* | 8/2013 | Lin | G06F 3/041 |
| | | | 345/173 |
| 8,941,602 B2* | 1/2015 | Kim | G06F 3/0418 |
| | | | 345/156 |
| 2011/0115724 A1 | 5/2011 | Jeon et al. | |
| 2012/0056834 A1 | 3/2012 | Kim et al. | |
| 2013/0076675 A1* | 3/2013 | Shin | G06F 3/0416 |
| | | | 345/173 |
| 2013/0093720 A1* | 4/2013 | Liu | G06F 3/0416 |
| | | | 345/174 |
| 2013/0141372 A1* | 6/2013 | Kang | G06F 3/041 |
| | | | 345/173 |
| 2013/0221993 A1 | 8/2013 | Ksondzyk et al. | |
| 2013/0241873 A1* | 9/2013 | Kim | H05K 1/0228 |
| | | | 345/174 |
| 2015/0054763 A1* | 2/2015 | Yang | G06F 3/0418 |
| | | | 345/173 |

FOREIGN PATENT DOCUMENTS

| | | |
|---|---|---|
| KR | 1020130053060 | 5/2013 |
| KR | 1020130055525 | 5/2013 |
| KR | 1020130063973 | 6/2013 |
| KR | 1020130065348 | 6/2013 |
| KR | 1020130065355 | 6/2013 |

* cited by examiner

DISPLAY APPARATUS AND METHOD FOR DRIVING THE SAME WITH INCREASED TOUCH RECOGNITION

This application claims priority from and benefit under 35 U.S.C. §119(a) of Korean Patent Application No. 10-2014-0012136, filed on Feb. 3, 2014, which is herein incorporated by reference for all purposes as if fully set forth herein.

BACKGROUND

Field

Exemplary embodiments of the present inventive concept relate to a display apparatus and a method for driving the display apparatus. More particularly, exemplary embodiments of the present inventive concept relate to a display apparatus with increased touch recognition rates and a method for driving the display apparatus.

Discussion of the Background

A display apparatus may include a touch panel which senses a touch event that occurred on a screen, and outputs a touch signal. As the thickness of the display apparatus decreases, a noise defect of the display apparatus may increase.

A ripple noise of a common voltage, which is generated according to a physical characteristic of the display panel and a display pattern, may cause a noise defect of the touch panel.

A frequency hopping method, a high voltage driving method and a liquid crystal display ("LCD") sync method may be applied to reduce the ripple noise of the common voltage. According to the frequency hopping method, a frequency range of the touch signal may be changed into a frequency range in which noises are not generated by detecting a frequency range of the ripple noise. According to the high voltage driving method, voltage levels of the touch signal may be increased, so that the touch signal may become insensitive to the ripple noise. According to the LCD sync method the touch event may be sensed during blank periods in which the ripple noise decreases.

The frequency hopping method may not be applied when the ripple noise is generated in the entire frequency range. The high voltage driving method may have a disadvantage of relatively high power consumption. In the LCD sync method, a report rate of a touch position may be limited under a frame rate of the display panel, as the touch event is sensed during the blank periods.

SUMMARY

Exemplary embodiments of the present inventive concept provide a display apparatus capable of increasing touch recognition rates by estimating and reducing a ripple noise defect of common voltages.

Exemplary embodiments of the present inventive concept also provide a method for driving the display apparatus.

According to an exemplary embodiment of the present inventive concept, a display apparatus includes a display panel, a touch panel, a data driver, a common voltage noise predictor and a touch position detector. The display panel includes a plurality of data lines and a plurality of pixels. The pixels are electrically connected to the data lines, respectively. The touch panel is configured to output a first touch signal based on a touch event. The data driver is configured to output a data voltage to the data line based on a data signal. The common voltage noise predictor is configured to output a common voltage noise compensating signal based on the data signal. The touch position detector is configured to detect a touch position based on the common voltage noise compensating signal and the first touch signal.

According to an exemplary embodiment, a method of driving a display apparatus includes outputting a first touch signal in response to a touch event, outputting a common voltage noise compensating signal based on a data signal, and detecting a touch position based on the first touch signal and the common voltage noise compensating signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
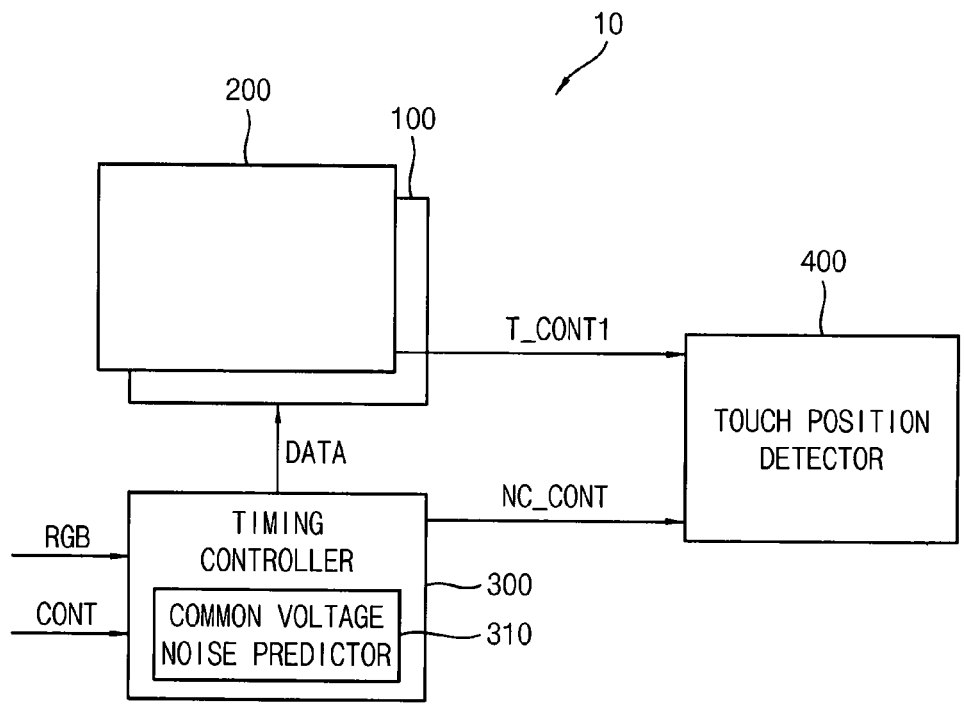
FIG. 1 is a block diagram illustrating a display apparatus according to an exemplary embodiment of the present inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. It will be understood that for the purposes of this disclosure, "at least one of X, Y, and Z" can be construed as X only, Y only, Z only, or any combination of two or more items X, Y, and Z (e.g., XYZ, XYY, YZ, ZZ). Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Figure 2:
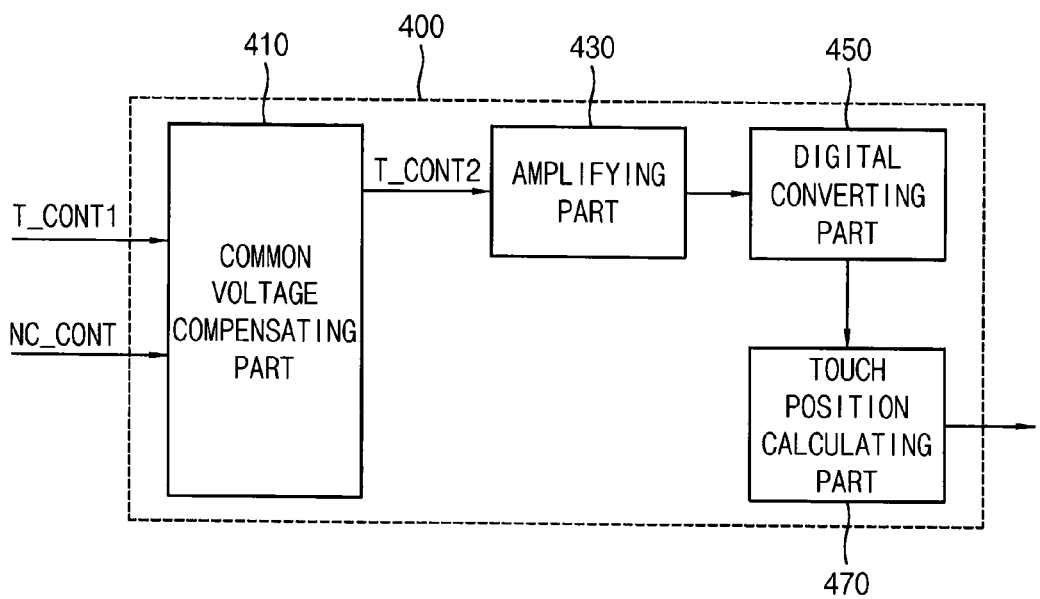
FIG. 2 is a block diagram illustrating a touch position detector of FIG. 1.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein FIG. 1 is a block diagram illustrating a display apparatus according to an exemplary embodiment of the present inventive concept. FIG. 2 is a block diagram illustrating a touch position detector of FIG. 1.

Referring to FIG. 1, the display apparatus 10 includes a display panel 100, a touch panel 200, a timing controller 300, a common voltage noise predictor 310, and a touch position detector 400.

The display panel 100 which displays an image may include a first substrate, a second substrate facing the first substrate, and a liquid crystal layer disposed between the first substrate and the second substrate. Although not shown in the figures, the display panel 100 may further include a gate driver, a data driver and a gamma reference voltage generator.

The display panel 100 includes a plurality of gate lines, a plurality of data lines, and a plurality of unit pixels connected to the gate lines GL and the data lines DL. The gate lines extend in a first direction and the data lines extend in a second direction crossing the first direction.

Each unit pixel includes a switching element, a liquid crystal capacitor, and a storage capacitor. The liquid crystal capacitor and the storage capacitor are electrically connected to the switching element. The unit pixels may be disposed in a matrix. A common voltage may be applied to the storage capacitor.

The timing controller 300 receives input image data RGB and an input control signal CONT from an external apparatus. The input image data RGB may include red image data, green image data, and blue image data. The input control signal CONT may include a master clock signal and a data enable signal. The input control signal CONT may further include a vertical synchronizing signal and a horizontal synchronizing signal.

The timing controller 300 generates a first control signal CONT1, a second control signal CONT2, a third control signal CONT3, and a data signal DATA based on the input image data RGB and the input control signal CONT.

The timing controller 300 generates the first control signal CONT1 for controlling an operation of the gate driver based on the input control signal CONT, and outputs the first control signal CONT1 to the gate driver. The first control signal CONT1 may further include a vertical start signal and a gate clock signal.

The timing controller 300 generates the second control signal CONT2 for controlling an operation of the data driver based on the input control signal CONT, and outputs the second control signal CONT2 to the data driver. The second control signal CONT2 may include a horizontal start signal and a load signal.

The timing controller 300 generates the data signal DATA based on the input image data RGB. The timing controller 300 outputs the data signal DATA to the data driver. The data signal DATA may include grayscale values corresponding to the respective unit pixels.

The timing controller 300 generate the third control signal CONT3 for controlling an operation of the gamma reference voltage generator based on the input control signal CONT, and outputs the third control signal CONT3 to the gamma reference voltage generator.

The gate driver generates gate signals driving the gate lines in response to the first control signal CONT1 received from the timing controller 300. The gate driver sequentially outputs the gate signals to the gate lines.

The gamma reference voltage generator generates a gamma reference voltage in response to the third control signal CONT3 received from the timing controller 300. The gamma reference voltage generator provides the gamma reference voltage to the data driver. The gamma reference voltage has a value corresponding to a level of the data signal DATA.

The gamma reference voltage generator may be disposed in the timing controller 300 or in the data driver.

The data driver receives the second control signal CONT2 and the data signal DATA from the timing controller 300, and receives the gamma reference voltages from the gamma reference voltage generator. The data driver converts the data signal DATA into analog data voltages using the gamma reference voltages and outputs the data voltages to the data lines.

The touch panel 200 includes a plurality of touch sensors outputting a first touch signal T_CONT1 in response to a touch event that occurs when an object, such as a finger, contacts an external screen. The touch panel 200 may output the first touch signal T_CONT1 to the touch position detector 400. The touch panel 200 may include, for example, an external type touch panel, an on-cell type touch panel, or an in-cell type touch panel. The on-cell type touch panel may include a touch sensor layer disposed on the display panel. The in-cell type touch panel may include a touch sensor layer disposed between the display panel and the liquid crystal layer. In addition, the touch panel 200 may further include capacitive type touch panels such as a self capacitive type touch panel and a mutual capacitive type touch panel.

The first touch signal T_CONT1 may include a signal generated by the touch sensors and a ripple noise of the common voltage.

As shown in FIG. 1, the common voltage noise predictor 310 may be disposed in the timing controller 300. The common voltage noise predictor 310 may output a common voltage noise compensating signal NC_CONT to the touch position detector 400 based on the data signal DATA.

The common voltage noise compensating signal NC_CONT may include a signal to cancel out the ripple noise. For example, the common voltage noise compensating signal NC_CONT may include a reversed signal of the ripple noise, i.e., an inverted version of the ripple noise.

The common voltage noise compensating signal NC_CONT may be predetermined by a pattern of the data signal DATA. The common voltage noise predictor 310 may include a memory having the common voltage noise compensating signal NC_CONT corresponding to the pattern of the common voltage. For example, the common voltage noise predictor 310 may include a look-up table including the common voltage noise compensating signal NC_CONT corresponding to the pattern of the common voltage.

Figure 3A:
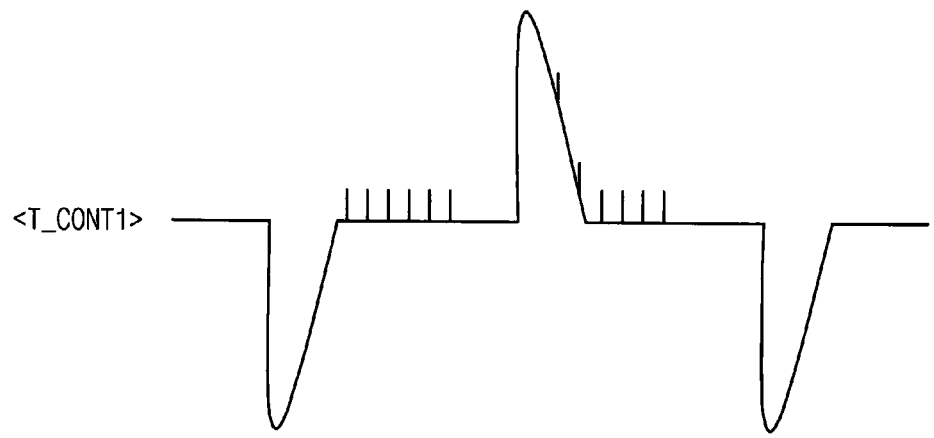
FIG. 3A is a waveform diagram illustrating a primitive touch signal output from a touch panel of FIG. 1.
Figure 3B:
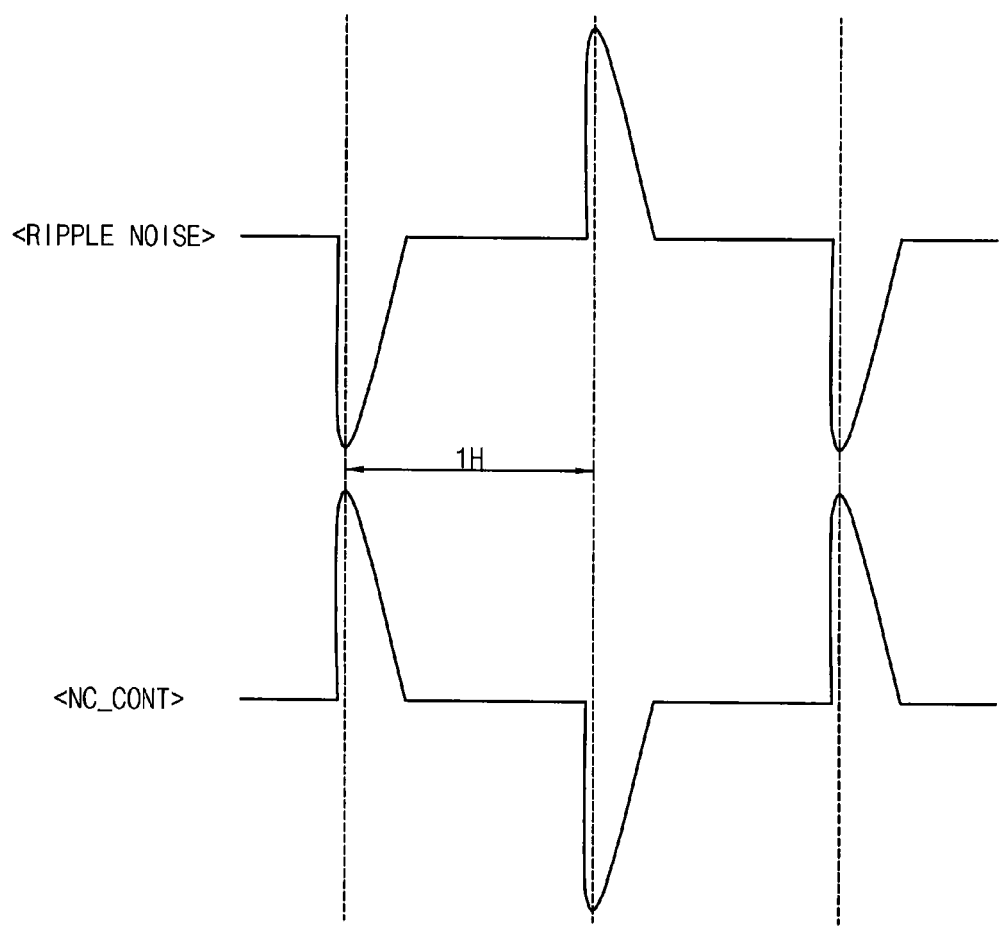
FIG. 3B is a waveform diagram illustrating a ripple noise of the primitive touch signal of FIG. 3A and a common voltage noise compensating signal output from a common voltage noise predictor of FIG. 1.
Figure 4:
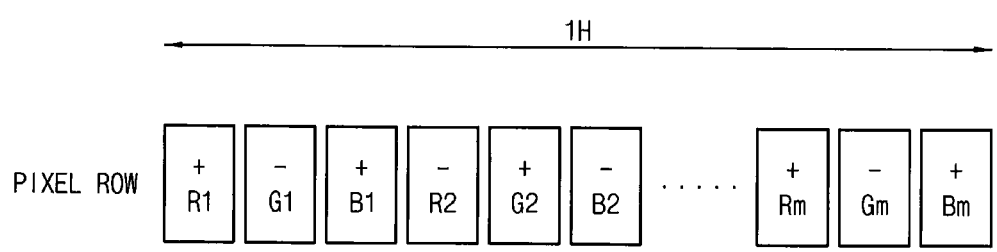
FIG. 4 is a conceptual diagram illustrating a data signal applied to a display panel of FIG. 1 during a horizontal period.

The common voltage noise compensating signal NC_CONT is explained in detail referring to FIGS. 3A to 4, according to an exemplary embodiment of the present inventive concept.

In FIG. 2, the touch position detector 400 as shown in FIG. 1 is described in detail, according to an exemplary embodiment of the present inventive concept.

As illustrated in FIG. 2, the touch position detector 400 may detect a touch position based on the first touch signal T_CONT1 and the common voltage noise compensating signal NC_CONT. The touch position detector 400 may include a common voltage compensating part (common voltage compensator) 410, an amplifying part (amplifier) 430, a digital converting part (digital converter) 450, and a touch position calculating part (touch position calculator) 470. The touch position detector 400 may be embodied as a chip including the common voltage compensating part 410, the amplifying part 430, the digital converting part 450 and the touch position calculating part 470.

The common voltage compensating part 410 may receive the first touch signal T_CONT1 and the common voltage noise compensating signal NC_CONT. The common voltage compensating part 410 may output a second touch signal T_CONT2 based on the first touch signal T_CONT1 and the common voltage noise compensating signal NC_CONT.

The common voltage compensating part 410 may cancel out the ripple noise included in the first touch signal T_CONT1, by using the common voltage noise compensating signal NC_CONT. The second touch signal T_CONT2 may be determined by removing/canceling out the ripple noise from the first touch signal T_CONT1 from which the ripple noise removed. For example, the common voltage compensating part 410 may generate the second touch signal T_CONT2 by using the common voltage noise compensating signal NC_CONT to cancel the ripple noise from the first touch signal T_CONT1.

The first touch signal T_CONT1 and the common voltage noise compensating signal NC_CONT may include analog voltages, respectively.

The amplifying part 430 may amplify the second touch signal T_CONT2. The digital converting part 450 may convert the second touch signal T_CONT2 output from the amplifying part 430 to a digital value. The touch position calculating part 470 may calculate the touch position based on the second touch signal T_CONT2 output from the digital converting part 450. For example, the amplifying part 430 may amplify the second touch signal T_CONT2 to output an amplified second touch signal T_CONT2. The digital converting part 450 may convert the amplified second touch signal T_CONT2 to a digital second touch signal T_CONT2. The touch position calculating part 470 may then calculate the touch position based on the digital second touch signal T_CONT2.

Figure 5:
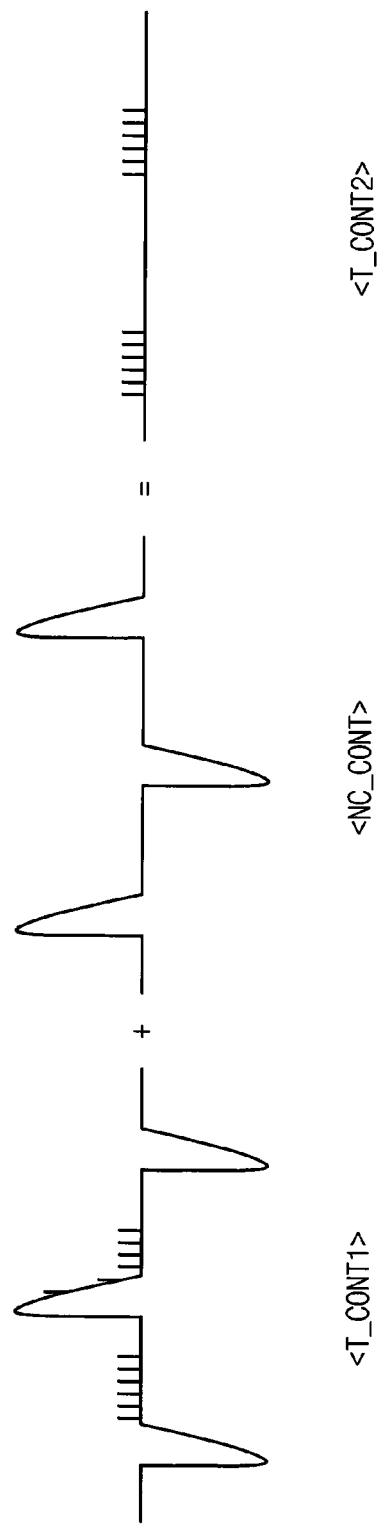
FIG. 5 is a waveform diagram illustrating an input-output signal of common voltage compensating part of FIG. 1.

FIG. 3A is a sample waveform diagram illustrating a primitive touch signal output from a touch panel 200 of FIG. 1. FIG. 3B is a sample waveform diagram illustrating a ripple noise of the primitive touch signal of FIG. 3A and a common voltage noise compensating signal output from a common voltage noise predictor 310 of FIG. 1. FIG. 4 is a conceptual diagram illustrating a data signal applied to a display panel 100 of FIG. 1 during a horizontal period. FIG. 5 is sample waveform diagram illustrating the input signals T_CONT1+NC_CONT and the output signal T_CONT2 of common voltage compensating part 410 of FIG. 2.

Referring to FIGS. 1 to 5, the first touch signal T_CONT1 output from the touch panel 200 of FIG. 1 may include a sensing signal generated by a touch and the ripple noise of the common voltage. In FIG. 3A, the sensing signal, for example, is illustrated as plural vertical lines which are separated from each other. The sensing signal may be a waveform having plural vertexes and may be distorted by the ripple noise of the common voltage.

As shown in FIG. 3B, the common voltage noise compensating signal NC_CONT output from the common voltage noise predictor 310 of FIG. 1 may include a reversed signal of the ripple noise. In other words, the common voltage noise compensating signal NC_CONT may be an inverted version of the ripple noise. The ripple noise may include a specific waveform corresponding to a pattern of the data signal DATA. Thus, the common voltage noise predictor 310 may store reversed/inverted signals of the ripple noises, which correspond to the respective patterns of the data signal DATA, as the common voltage noise compensating signal NC_CONT.

The pattern of the data signal DATA may be determined based on a sum of the grayscale values applied to the display panel 100 of FIG. 1 during one horizontal period 1H as shown in FIG. 3B and FIG. 4.

For example, the display panel 100 includes pixel rows. The display panel 100 may be driven in a column inversion method, for example. As shown in FIG. 4, each pixel row may include a first red pixel R1, a first green pixel G1, a first blue pixel B1, a second red pixel R2, a second green pixel G2, a second blue pixel B2, . . . , an m-th red pixel Rm, an m-th green pixel Gm and an m-th blue pixel Bm.

The pattern of the data signal DATA may include a sum of grayscale values corresponding to the first red pixel R1 to the m-th blue pixel Bm. The grayscale values may have positive polarity and negative polarity in an alternating arrangement.

As shown in FIG. 5, the common voltage compensating part (common voltage compensator) 410 of FIG. 2 may cancel out the ripple noise included in the first touch signal T_CONT1 by using the common voltage noise compensating signal NC_CONT. The second touch signal T_CONT2 may be free of distortion, due to the cancellation of the ripple noise from the first touch signal T_CONT1.

Figure 6:
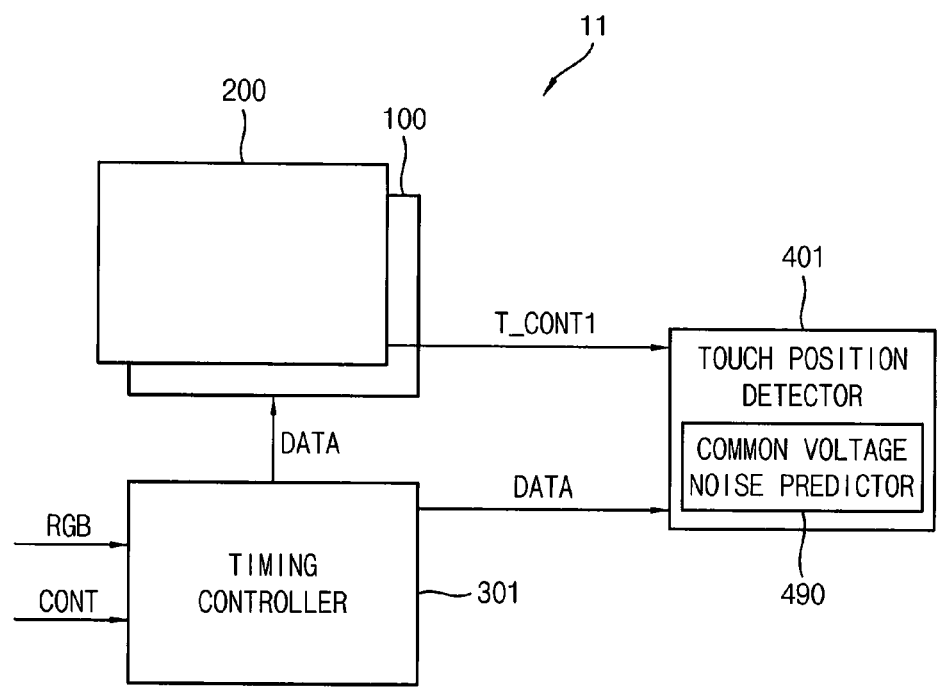
FIG. 6 is a block diagram illustrating a display apparatus according to an exemplary embodiment of the present inventive concept.
Figure 7:
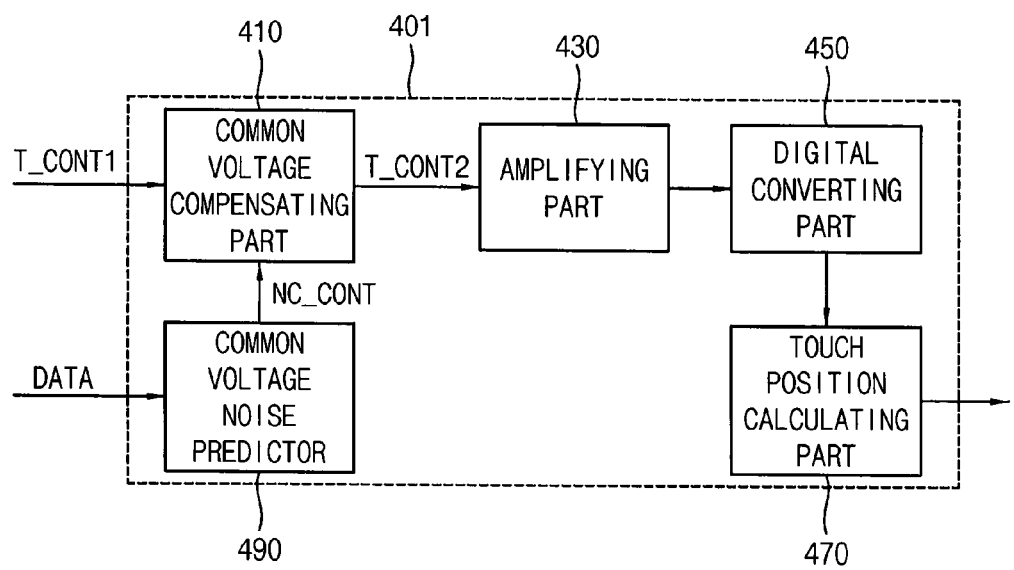
FIG. 7 is a block diagram illustrating a touch position detector of FIG. 6.

FIG. 6 is a block diagram illustrating a display apparatus according to an exemplary embodiment of the present inventive concept. FIG. 7 is a block diagram illustrating a touch position detector of FIG. 6.

In FIG. 6, the display apparatus 11 is substantially the same as the display apparatus 10 of FIGS. 1 and 2 except that a common voltage noise predictor 490 is included in a touch position detector 401 and not in the time controller 301, as in display apparatus 10 of FIG. 1. Thus, the same reference numerals will be used to refer to same or like parts as those described in with reference to FIGS. 1 and 2 and any further repetitive explanation concerning the above elements will be omitted.

Referring to FIG. 6, the display apparatus 11 includes a display panel 100, a touch panel 200, a timing controller 301 and a touch position detector 401.

The timing controller 301 is substantially the same as the timing controller 300 in FIG. 1 except that the common voltage noise predictor 490 is not included in the timing controller 301. The timing controller 301 may output the data signal DATA to the touch position detector 401 in addition to the display panel 100.

Referring to FIG. 7, the touch position detector 401 of FIG. 6 may detect a touch position based on the first touch signal T_CONT1 received from the touch panel 200 and the data signal DATA received from the timing controller 301. The touch position detector 401 may include the common voltage noise predictor 490, a common voltage compensating part (common voltage compensator) 410, an amplifying part (amplifier) 430, a digital converting part (digital converter) 450, and a touch position calculating part (touch position calculator) 470. The touch position detector 401 may be embodied as a chip including the common voltage noise predictor 490, the common voltage compensating part 410, the amplifying part 430, the digital converting part 450, and the touch position calculating part 470.

As shown in FIG. 7, the common voltage noise predictor 490 may output a common voltage noise compensating signal NC_CONT to the common voltage compensating part 410 based on the data signal DATA. The common voltage noise predictor 490 is substantially the same as the common voltage noise predictor 310 in FIGS. 1 to 4 except that the common voltage noise predictor 490 is disposed in the touch position detector 401 and output the common voltage noise compensating signal NC_CONT to the common voltage compensating part 410.

Figure 8:
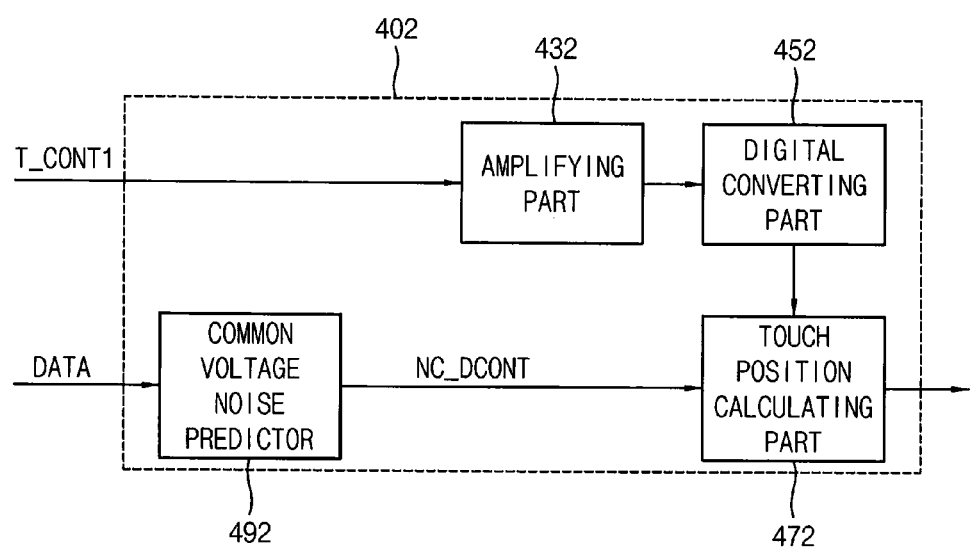
FIG. 8 is a block diagram illustrating a touch position detector according to an exemplary embodiment of the present inventive concept.

FIG. 8 is a block diagram illustrating a touch position detector 402 according to an exemplary embodiment of the present inventive concept.

The display apparatus according to the illustrated exemplary embodiment is substantially the same as the display apparatus in FIG. 6 except for including a touch position detector 402 in lieu of the touch position detector 401. Thus, the same reference numerals will be used to refer to same or like parts as those described in with reference to FIGS. 1, 2, 6 and 7 and any further repetitive explanation concerning the above elements will be omitted.

Referring to FIGS. 6 and 8, the display apparatus includes a display panel 100, a touch panel 200, a timing controller 301 and a touch position detector 402.

As shown in FIG. 8, the touch position detector 402 may detect a touch position based on the first touch signal T_CONT1 and the data signal DATA. The touch position detector 402 may include the common voltage noise predictor 492, an amplifying part (amplifier) 432, a digital converting part (digital convertor) 452 and a touch position calculating part (touch position calculator) 472. The touch position detector 402 may be embodied as a chip including the common voltage noise predictor 492, the amplifying part 432, the digital converting part 452 and the touch position calculating part 472.

The common voltage noise predictor 492 may output a common voltage noise compensating digital signal NC_DCONT to the touch position calculating part 472 based on the data signal DATA. The common voltage noise compensating digital signal NC_DCONT may include a digital converted value of the common voltage noise compensating signal NC_CONT as explained in reference to FIGS. 3A to 5.

The common voltage noise predictor 492 is substantially the same as the common voltage noise predictor 490 in FIG. 7, except that the common voltage noise predictor 492 outputs the common voltage noise compensating digital signal NC_DCONT to the touch position detector 472.

The amplifying part 432 may amplify the first touch signal T_CONT1. The digital converting part 452 may convert the first touch signal T_CONT1 output from the amplifying part 432 to a digital value. The touch position calculating part 472 may calculate the touch position based on the first touch signal T_CONT1 output from the digital converting part 452 and the common voltage noise compensating digital signal NC_DCONT. For example, the amplifying part 432 may amplify the first touch signal T_CONT1 to output an amplified first touch signal T_CONT1. The digital converting part 452 may convert the amplified first touch signal T_CONT1 to a digital first touch signal T_CONT1. The touch position calculating part 472 may calculate the touch position based on the digital first touch signal T_CONT1 and the common voltage noise compensating digital signal NC_DCONT. For example, the touch position calculating part 472 may calculate the touch position by removing the ripple noise from the digital first touch signal T_CONT1 by using the common voltage noise compensating digital signal NC_DCONT.

According to the illustrated exemplary embodiments, common voltage noise predictor may estimate a ripple noise which is generated in a common voltage based on a pattern of a data signal applied to a display panel. Thus, a display apparatus including the common voltage noise predictor may reduce the ripple noise when the ripple noise is generated in the entire frequency range. In addition, the display apparatus may reduce the ripple noise without a disadvantage of relatively high power consumption and may reduce the ripple noise without a limitation of a frame rate of a display panel. Thus, touch recognition rates of a touch panel of the display apparatus may increase.

A display apparatus of the illustrated exemplary embodiments may be applied to a mobile type display apparatus including but not limited to a mobile phone, a note book computer and a tablet computer, a fixed type display such as a television and a desktop display, and a display of a general appliance such as a refrigerator, a washing machine and an air conditioner.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative, and it is intended that the present invention cover the modifications and variations of this invention provided they come within the scope of the appended claims and their equivalents.

What is claimed is:

1. A display apparatus comprising:
    a display panel comprising data lines and pixels respectively electrically connected to the data lines;
    a touch panel configured to output a first touch signal in response to a touch event, the first touch signal comprising a ripple noise of a common voltage;
    a data driver configured to output a data voltage to the data lines, based on a data signal;
    a common voltage noise predictor configured to output a common voltage noise compensating signal based on a pattern of the data signal, the common voltage noise compensating signal comprising a signal that is an inverted version of the ripple noise of the common voltage; and
    a touch position detector configured to detect a touch position, based on the common voltage noise compensating signal and the first touch signal,
    wherein:
    the data signal comprises grayscale values corresponding to each of the pixels,
    the pattern of the data signal is determined based on a sum of the grayscale values applied to the display panel during a horizontal period, and
    the common voltage noise predictor comprises a look-up table comprising the common voltage noise compensating signal corresponding to the pattern of the common voltage, the ripple noise of the common voltage corresponding to the pattern of the data signal.

2. The display apparatus of claim 1, wherein the touch position detector comprises:
    a common voltage compensator configured to output a second touch signal based on the common voltage noise compensating signal and the first touch signal; and
    a touch position calculator configured to calculate the touch position based on the second touch signal.

3. The display apparatus of claim 2, wherein the touch position detector further comprises:
    an amplifier configured to amplify the second touch signal to output an amplified second touch signal; and
    a digital converter configured to convert the amplified second touch signal to a digital second touch signal,
    the touch position calculator configured to calculate the touch position based on the digital second touch signal.

4. The display apparatus of claim 2, further comprising a timing controller configured to control a driving timing of the data driver and to output the data signal to the data driver, wherein the timing controller comprises the common voltage noise predictor.

5. The display apparatus of claim 2, wherein the touch position detector comprises a timing controller configured to control a driving timing of the data driver and to output the data signal to the data driver.

6. The display apparatus of claim 1, wherein the touch position detector comprises:
    an amplifier configured to amplify the first touch signal to output an amplified first touch signal;
    a digital converter configured to convert the amplified first touch signal to a digital first touch signal; and
    a touch position calculator configured to calculate the touch position based on the digital first touch signal and the common voltage noise compensating signal.

7. The display apparatus of claim 6, wherein the common voltage noise compensating signal comprises a digital signal.

8. The display apparatus of claim 6, wherein the common voltage noise predictor is comprised by the touch position detector.

9. A method of driving a display apparatus, the method comprising:
    outputting a first touch signal in response to a touch event, the first touch signal comprising a ripple noise of a common voltage;
    outputting a common voltage noise compensating signal based on a pattern of a data signal, the common voltage noise compensating signal comprising a signal that is an inverted version of the ripple noise of the common voltage;
    detecting a touch position based on the first touch signal and the common voltage noise compensating signal; and
    determining the pattern of the data signal based on a sum of grayscale values applied to a display panel during a horizontal period, the data signal comprising grayscale values corresponding to each pixel,
    wherein outputting a common voltage noise compensating signal comprises reading the common voltage noise compensating signal from a look-up table comprising the common voltage noise compensating signal corresponding to the pattern of the common voltage, the ripple noise of the common voltage corresponding to the pattern of the data signal.

10. The method of claim 9, further comprising determining the common voltage noise compensating signal based on a pattern of the data signal.

11. The method of claim 9, wherein: the detecting the touch position further comprises:
    generating a second touch signal by removing noise from the first touch signal by using the common voltage noise compensating signal; and
    calculating the touch position based on the second touch signal.

12. The method of claim 11, wherein the detecting the touch position further comprises:
    amplifying the second touch signal to output an amplified second touch signal;
    converting the amplified second touch signal to a digital second touch signal; and calculating the touch position based on the digital second touch signal.

13. The method of claim 9, wherein the detecting the touch position further comprises:
converting the first touch signal to a digital first touch signal;
removing a noise from the digital first touch signal by using the common voltage noise compensating signal; and
calculating the touch position based on the digital first touch signal from which the noise is removed.

14. The method of claim 13, wherein the common voltage noise compensating signal comprises a digital signal.

* * * * *